United States Patent

Crits

[11] 4,219,414
[45] Aug. 26, 1980

[54] METHOD FOR FLUID PURIFICATION AND DEIONIZATION

[75] Inventor: George J. Crits, Havertown, Pa.
[73] Assignee: Crane Co., New York, N.Y.
[21] Appl. No.: 950,921
[22] Filed: Oct. 12, 1978
[51] Int. Cl.² .................... B01D 15/06; B01D 29/38
[52] U.S. Cl. .................................... 210/27; 210/33; 210/80
[58] Field of Search ............... 210/24, 27, 33, 80, 210/274, 269, 290

[56] References Cited

U.S. PATENT DOCUMENTS

| | | | |
|---|---|---|---|
| 2,973,319 | 2/1961 | Porter | 210/33 |
| 3,208,934 | 9/1965 | Kingsbury | 210/33 |
| 3,250,703 | 5/1966 | Levendusky | 210/24 |
| 3,351,488 | 11/1967 | Zievers et al. | 210/33 X |
| 3,455,819 | 7/1969 | Crits | 210/274 X |
| 3,515,277 | 6/1970 | Kingsbury et al. | 210/33 |
| 3,680,701 | 8/1972 | Holca | 210/274 |
| 3,814,245 | 6/1974 | Hirs | 210/290 X |

OTHER PUBLICATIONS

"Electro Magnetic Filters Means Savings," Babcock and Wilcox Bulletin.
"Sala-HGMF Magnetic Filters," Sala Magnetics Bulletin, 1977.

Primary Examiner—John Adee

[57] ABSTRACT

A method for continuously removing undissolved matter from a fluid and for selectively deionizing the fluid when the concentration of undesired ions exceeds a predetermined level, comprising the steps of passing the fluid through a tank containing a filtering means; adding ion exchange means to the tank when the concentration of undesired ions exceeds the predetermined level; removing the ion exchange means, when exhausted, from the tank; and removing undissolved matter from the filtering means and transporting the matter thus removed from the tank.

6 Claims, 3 Drawing Figures

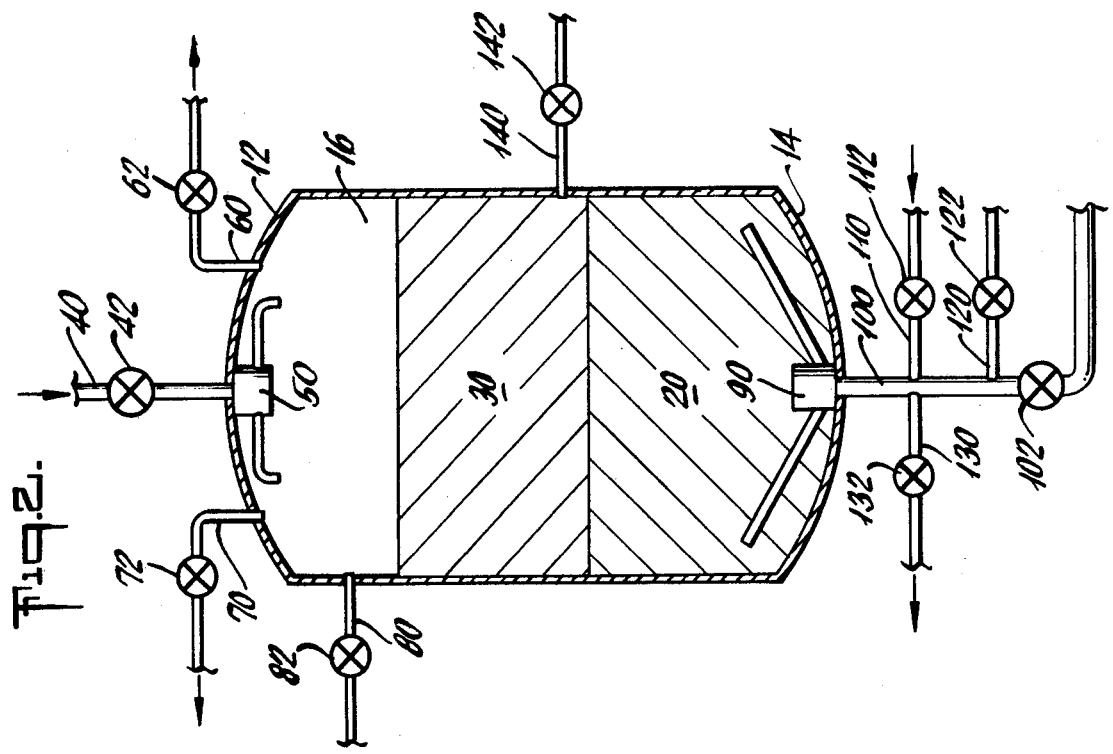
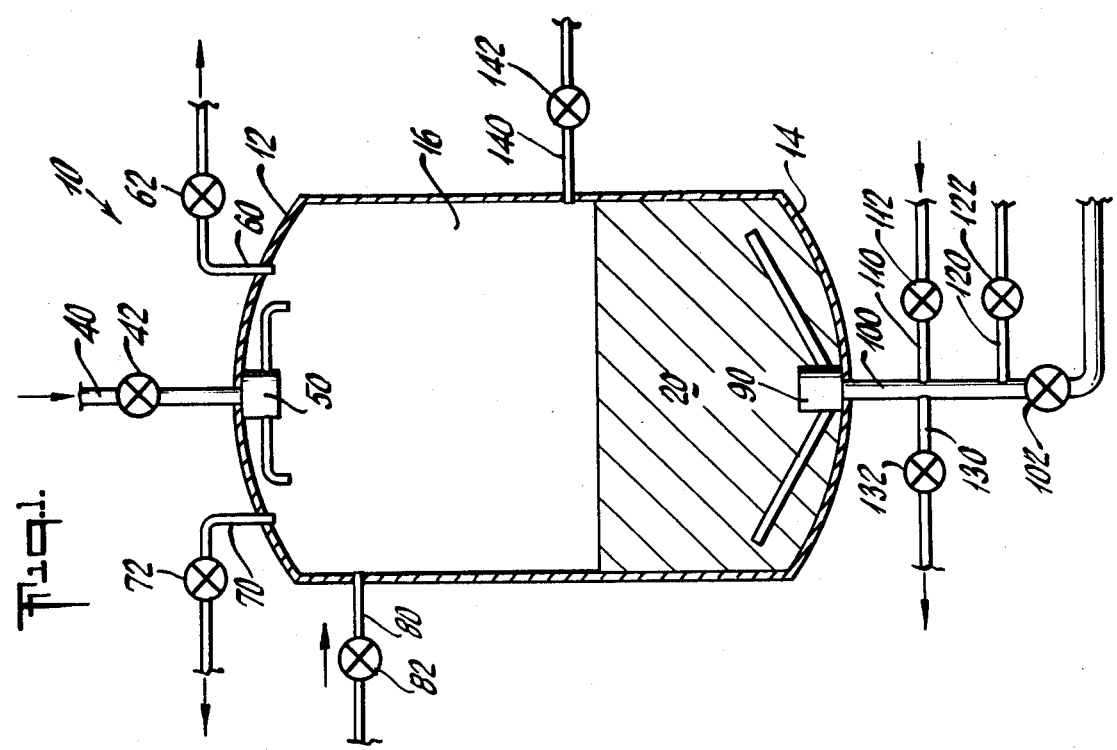

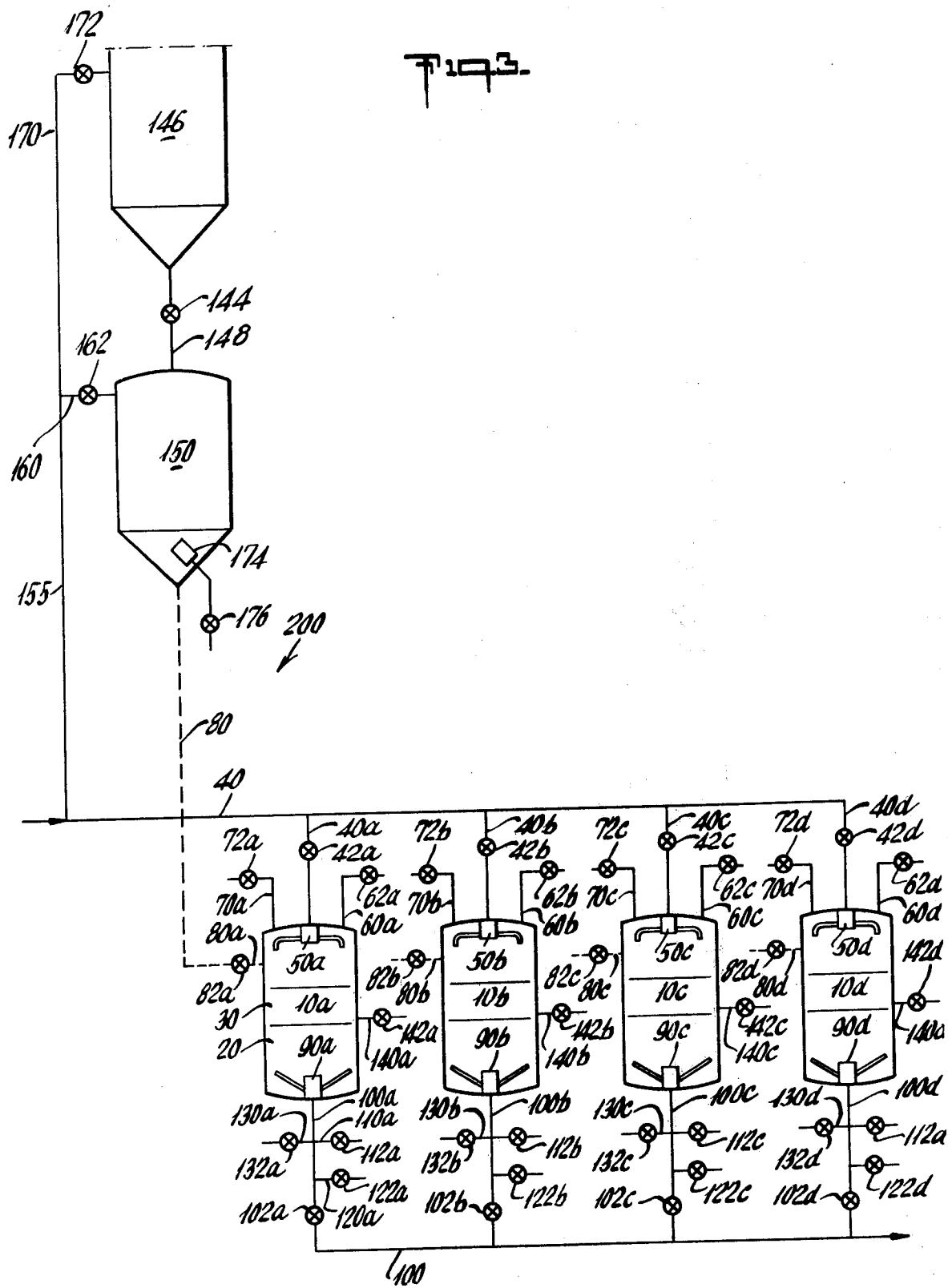

METHOD FOR FLUID PURIFICATION AND DEIONIZATION

BACKGROUND & SUMMARY OF THE INVENTION

In processes using high pressure steam, such as conventional and nuclear power plants, the recirculated steam contains iron oxide and other corrosion products. Normally, the sodium concentration in the recirculated steam condensate is below the levels at which it adversely affects operations. However, the sodium concentration can increase to the point where it fouls turbine blades when there is leakage of cooling water from condenser tubes into the recirculated steam condensate, reducing turbine efficiency. Thus, it is usually necessary to install facilities to demineralize condensate during periods of high sodium concentration.

In many installations it has been common practice to pass all condensate through ion exchange beds when, for the most part, these beds merely operate as filters for removing undissolved matter, such as iron oxide and other undissolved matter (normally referred to as "crud"), from the system. Since it is prohibitively expensive to discard ion exchange resin after it has become fouled in a system in which all condensate is circulated through the resin bed, ion exchange regeneration facilities normally are installed. In addition to the large capital investments required, these regeneration facilities also use relatively large quantities of regenerants, such as sulfuric acid and sodium hydroxide. Moreover, conventional deionization systems, both regenerable and nonregenerable, usually are not capable of producing an effluent below 0.5 ppb sodium. In many installations the condensate purification equipment is by-passed during periods of low sodium/chlorides concentration to minimize the sodium concentration in the condensate and to reduce regenerant consumption. However, during this by-pass period filterable contaminants are not removed from the condensate.

In other prior art condensate purification installations, filter septa or elements precoated with ion exchange resin are utilized to remove crud and deionize the condensate. These installations may be somewhat complex involving precoating tanks and precoat pumping facilities. Care must be taken to produce a substantially uniform precoat over the filters to prevent channeling and poor fluid flow distribution through the filters. Moreover, if the precoat layer is too thick, excessive pressure drop results, necessitating the installation of larger, more expensive pumps. In addition, removal and replacement of fouled or clogged filter elements or septa can be burdensome and time consuming.

In still other systems, the condensate is passed through electrically charged stainless steel beads to set up a magnetic field in which metallic impurities are trapped by the beads. This system has several disadvantages including high initial cost, high operating cost and inability to deionize the fluid processed.

An object of the present invention is to install a condensate purification system having a low initial cost and a low operating cost.

Another object is to provide a relatively simple system which has the capability to filter condensate with or without deionization.

A further object is to provide a system for removing crud without increasing the sodium concentration in the condensate.

The above-noted objects are met in the system described and claimed herein. A conventional tank is charged with a crud filtering means, such as filtering beads, preferably being chemically inert beads such as stainless steel beads or plastic beads filled with a relatively dense material having a density differing from that of the ion exchange means to be utilized. During periods of low sodium or chlorides concentration, the condensate is passed through a tank containing only this filtering means, while during periods of high sodium or chloride concentration in the condensate, ion exchange means such as conventional ion exchange resin, can be selectively added to the tank to deionize the condensate. If the ion exchange density differs from that of the filtering means, the resin subsequently can be separated and removed by conventional methods for regeneration or disposal when it becomes fouled or exhausted, while the entrapped undissolved matter may be removed from the filtering means in place by conventional air scrubbing and backwashing methods.

BRIEF DESCRIPTION OF THE DRAWINGS

FIG. 1 is an elevational view, in section, of a typical condensate polishing tank together with associated valves and piping, the tank containing only crud filtering means.

FIG. 2 is an elevational view similar to that shown in FIG. 1, the tank containing both filtering beads and ion exchange resin.

FIG. 3 is an elevational view in section of a typical continuous condensate filtration and demineralization installation for practicing the invention described and claimed herein.

DETAILED DESCRIPTION OF THE DRAWINGS

Referring to the drawings, and in particular FIG. 1, a conventional condensate polishing tank generally indicated as 10, is shown having upper dished head 12, lower dished head 14 spaced apart by cylindrical section 16, the tank containing inert crud filtering means, such as filtering beads 20, a specific embodiment being beads manufactured of stainless steel or manufactured of plastic and filled with a dense material. Condensate inlet line 40 controlled by valve 42 extends from a condensate inlet source (not shown) to conventional liquid distributor 50 located inside dished head 12. Vent line 60 provided with valve 62, and backwash line 70 controlled by valve 72 also pass through dished head 12, while resin inlet line 80 under control of valve 82 extends through cylindrical section 16. Condensate outlet line 100 having valve 102 extends from collector 90 disposed in dished head 14 to transport treated condensate away from tank 10. In the embodiment shown, resin transfer water line 110 having valve 112, air inlet line 120 having valve 122, and rinse outlet line 130 having valve 132 all communicate with tank 10 through line 100. An alternate spent resin line 140 and valve 142 also may be provided into tank 10 for transporting resin 30 from the tank for regeneration or disposal.

FIG. 2 depicts the same tank 10 as shown in FIG. 1, but with a layer of ion exchange resin 30 added on top of beads 20.

FIG. 3 illustrates a typical multi-tank continuous condensate polishing installation, generally indicated as 200, which would be used where a continuous supply of treated condensate is required even when one tank is taken out of service for regeneration. The tanks 10a, 10b, 10c and 10d are disposed in parallel between condensate inlet line 40 and condensate outlet line 100. Lines and associated valves substantially similar to those previously described with respect to FIGS. 1 and 2 have similar reference numerals together with suffixes corresponding to the suffix of the tank with which each is associated. Resin hopper 146 is disposed above and in communication with, resin feed tank 150 through transfer line 148 having valve 144. A branch 170 provided with valve 172 extends from condensate branch line 155 into resin hopper 150 to transfer resin from its resin hopper into resin feed tank 150 by sluicing. A screen 174 and valve 176 are added to tank 150 to remove the sluicing fluid. Another branch 160 provided with valve 162 extends from condensate branch line 155 into resin feed tank 150 to provide motive force for transferring resin from the feed tank through line 80 and lines 80a, 80b, 80c, 80d into tanks 10a, 10b, 10c, 10d, respectively.

Referring again to FIG. 1 tanks 10 is shown having filtering beads 20 contained therein, to filter but not deionize a fluid, such as condensate, passing downwardly through the tank from condensate inlet line 40 into condensate outlet line 100. When tank 10 is being operated in this manner, only valves 42 and 102 are open, all other valves being closed. When beads 20 become coated with crud from the condensate, valves 42 and 102 are closed to stop condensate flow through tank 10. The undissolved matter entrapped by beads 20 is removed and transported out of the tank by any practical method, such as by conventional air scrubbing and rinsing. For example, valves 122 and 62 may be opened to pass compressed air through the bed of beads 20 thereby agitating the beads and breaking loose the crud. After valves 122 and 62 have been closed, valve 72 in backwash outlet line 70 and valve 102 in condensate outlet line 100 should be opened to pass condensate upwardly through tank 10, thereby transporting the loosened crud from the tank. Care should be exercised during this process to keep the backwash flow rate below that at which beads 20 will become entrained with the backwashed condensate. When the dislodged crud has been removed from tank 10, valves 72 and 102 may be closed. If the crud has not been removed from beads 20 to a sufficient degree, the aforementioned air scrubbing and backwashing procedures may be repeated. After beads 20 have been scrubbed sufficiently, valve 132 in rinse outlet line 130 and valve 42 in condensate inlet line 40 may be opened to flush out any trace amounts of crud, after which valve 132 is closed and valve 102 opened to resume normal condensate filtering operations. Other procedures well-known in the art for scrubbing and backwashing resins are applicable for scrubbing beads 20, such as that disclosed in U.S. Pat. No. 3,445,819.

Referring to FIG. 2, when the sodium and/or chloride concentration of the condensate has increased to an unacceptably high level, ion exchange resin 30 may be added to tank 10. When untreated condensate is used as the sluicing medium, valve 42 is closed and valve 82 opened to permit the ion exchange resin to enter tank 10, the condensate exiting through condensate outlet line 100. After the desired quantity of resin has been added, valve 82 is closed, and valve 42 opened once again. Alternatively, tank 10 may be removed from service and resin 30 transferred by opening valves 82 and 132. The condensate thus passes through tank 10 and exits through rinse outlet line 130. Ion exchange resin 30 added to tank 10 operates to remove undesired ions as well as crud from the condensate.

In the following discussion, ion exchange resin 30 is termed "exhausted" when it is unable to remove undesired ions from the inlet fluid, whether this is due to the resin being chemically exhausted or fouled with crud. When ion exchange resin 30 has been exhausted, the resin may be removed from tank 10 for regeneration or discard. Valves 42 and 102 are closed, valve 72 opened and valve 112 opened slightly to permit a slight upward flow of fluid through tank 10 to hydraulically separate resin 30 from beads 20. If resin 30 is of a lower density than beads 20, the resin will form the upper layer, as shown in FIG. 2. Valve 112 then may be opened more fully to sluice resin 30 through line 72. This method for sluicing out the resin normally requires a water flow rate of approximately 50 GPM per square foot of cross-section area in a plane normal to the vertical axis of tank 10 and an air flow rate of 3 CFM per square foot for 2 minutes, and is particularly adapted for uses where the resin is discharged to waste. In an alternate method for removing resin 30, valves 112 and 142 are opened to permit condensate to pass upwardly through tank 10 from line 100 forcing resin 30 out line 140. A flow rate of 3–4 GPM per square foot for 10 minutes normally is required by this latter method, which finds applicability where resin 30 is sluiced into another vessel (not shown) for regeneration or disposal. After resin 30 has been removed from tank 10 by either method, beads 20 may then be scrubbed in the tank by the methods previously described. If the inlet condensate still contains unacceptably high concentrations of undesired ions, ion exchange resin 30 may again be added to tank 10 through line 80 as previously described prior to the tank being put back into service; otherwise the resin addition may be deferred until the concentration of sodium or chlorides exceeds certain pre-determined levels.

Referring to FIG. 3, a continuous condensate polishing system, generally indicated as 200, is shown, comprising a plurality of tanks 10a, 10b, 10c and 10d; a resin hopper 146; a resin feed tank 150; and associated valves and piping. Tanks 10a, 10b, 10c and 10d each operate independently in parallel, in substantially the same manner as tank 10 shown in FIGS. 1 and 2 and previously described.

When tanks 10a, 10b, 10c, and 10d containing only beads 20 are all in service, inlet condensate flowing through line 40 is divided to pass through lines 40a, 40b, 40c, 40d, tanks 10a, 10b, 10c, 10d, respectively, where it is filtered, and thence through lines 100a, 100b, 100c, 100d, respectively, after which the flow is recombined into line 100. When it is desired to add ion exchange resin 30 to tank 10a, valve 42a is closed to remove this tank from service while tanks 10b, 10c and 10d continue to treat inlet condensate entering through line 40 and exiting through line 100. Valve 144 between resin hopper 146 and resin feed tank 150, valve 172 in branch 170 and valve 176 on tank 150 all are opened until the desired quantity of resin has been transferred by sluicing and by gravity from the hopper into the resin feed tank. Condensate from line 40 passes through branch 170 into hopper 146 to sluice resin 30 into tank 150, afterwhich the condensate passes through screen 174 and valve 176 to a drain (not shown). After valves 144, 172 and 176 have been closed, valves 162 and 82a are opened enabling resin 30 to be sluiced from resin feed tank 150 into tank 10a by condensate from line 160, the condensate subsequently passing through tank 10a, line 100a and thence into line 100. Once the desired amount of resin 30 has been sluiced into tank 10a, valves 162 and 82a are closed and valve 42a is opened once again. It is obvious that the procedure for adding resin 30 to tanks 10b, 10c or 10d would be substantially similar to that described for tank 10a, with the substitution in the procedure of the corresponding valves on the respective tank. When resin 30 has become fouled or exhausted, it may be removed from any of the tanks, to be regenerated or discarded by the methods described in relation to FIG. 2.

The bed depth and dimensions of beads 20 in tank 10 are not critical, and are determined by the specifics of the particular condensate polishing system. It is believed that a typical bed depth of 18–30 inches having beads 20 in the 0.5 mm to 3.0 mm diameter range should be suitable for most applications. In bed depths below 18 inches the condensate may channel, resulting in poor filtration, while in bed depths in excess of 30 inches an undesirably high pressure drop across the bed may result with no commensurate improvement in condensate quality. Similarly, beads 20 having diameters greater than 30 mm may result in excess channeling and inadequate solids removal, while beads smaller than 0.5 mm in diameter may produce an unacceptably high pressure drop.

The exact composition of beads 20 is not critical. To prevent the addition of trace quantities of undesired metals or other foreign matter to the condensate being filtered, the beads should be made of materials chemically inert to the condensate. Beads 20 should also have a density sufficiently different from ion exchange resin 30, so that the beads and the resin can be separated by conventional hydraulic means. It is believed that stainless steel beads or plastic beads filled in with a relatively dense material normally will meet the chemical inertness and density requirements while being relatively inexpensive, although other materials also may be acceptable.

Resin 30 preferably comprises conventional cation and/or anion resin, the depth, choice of specific resins, and relative amounts being dependent on the types of ions present in the entering condensate. In normal filtration and deionization systems, resin 30 having a particle diameter range of about 0.05 mm to 1.5 mm and a bed depth of 3" to 24" normally will be satisfactory, the resin depth being determined, in part, by the flow rate, ion concentration in the condensate, allowable pressure drop and the desired operating time before removal of the ion exchange resin. When particles or resin 30 about 0.05 mm in diameter are used a bed depth of 1–3" normally should be sufficient, while when resin particles 1.5 mm are used, 24" or more might be used.

While the invention has been described in terms of filtration and demineralization of condensate, it is obvious that the invention is applicable to the polishing of other fluids. Certain modifications to the method and apparatus described herein will be obvious to those skilled in the art without departing from the spirit of the invention and are considered to be within the scope of the claims appended hereto.

I claim:

1. A method for continuously removing undissolved matter from fluid and for selectively deionizing the fluid when the undesired ion concentration exceeds a predetermined level comprising:
   A. passing the fluid through a tank containing filtering beads adapted to remove and entrap undissolved matter from but not to deionize the fluid;
   B. adding ion exchanges resin of a density lower than that of the filtering beads to remove the undesired ions from the fluid when the concentration of undesired ions exceeds the predetermined level.
   C. Separating hydraulically the ion exchange resin from the filtering beads prior to the resin being sluiced from the tank.
   D. removing the ion exchange resin, when exhausted, from the tank by sluicing; and,
   E. removing and entrapping undissolved matter from the filtering beads and transporting the matter thus removed out of the tank, whereby the filtering beads are again adapted to remove and entrap undissolved matter from the fluid passing through the tank.

2. The method of claim 1 wherein the undissolved matter is removed from the filtering means by air scrubbing.

3. The method of claim 2 wherein the fluid passed through the tank is steam condensate.

4. The method of claim 3 wherein the ion exchange resin is selected from the class consisting of anion exchange resin, cation exchange resin and mixtures thereof.

5. The method of claim 4 wherein the filtering beads are stainless steel beads.

6. The method of claim 4 wherein the filtering beads are plastic beads filled with with a relatively dense material.

* * * * *